(12) United States Patent
Reddy et al.

(10) Patent No.: US 9,158,845 B1
(45) Date of Patent: Oct. 13, 2015

(54) REDUCING LATENCIES IN WEB PAGE RENDERING

(75) Inventors: Sailu Reddy, Santa Cruz, CA (US); Sripal Togaru, Leesburg, VA (US); Christian Trillo, San Francisco, CA (US)

(73) Assignee: AOL Inc., Dulles, VA (US)

( * ) Notice: Subject to any disclaimer, the term of this patent is extended or adjusted under 35 U.S.C. 154(b) by 1793 days.

(21) Appl. No.: 11/183,184

(22) Filed: Jul. 18, 2005

Related U.S. Application Data

(63) Continuation-in-part of application No. 11/025,842, filed on Dec. 30, 2004, now abandoned.

(60) Provisional application No. 60/566,174, filed on Apr. 29, 2004.

(51) Int. Cl.
*G06F 17/30* (2006.01)

(52) U.S. Cl.
CPC ................ *G06F 17/30864* (2013.01)

(58) Field of Classification Search
CPC .......... G06F 17/30864; G06F 17/3089; G06F 17/2235; H04L 51/18; H04L 67/02
USPC ............ 707/10, 709–711; 709/203, 224, 232, 709/245, 246, 217–220; 358/1.15
See application file for complete search history.

(56) References Cited

U.S. PATENT DOCUMENTS

| | | | | |
|---|---|---|---|---|
| 6,003,082 | A * | 12/1999 | Gampper et al. | 709/225 |
| 6,012,085 | A * | 1/2000 | Yohe et al. | 709/217 |
| 6,081,774 | A * | 6/2000 | de Hita et al. | 704/9 |
| 6,829,654 | B1 * | 12/2004 | Jungck | 709/246 |
| 6,834,306 | B1 * | 12/2004 | Tsimelzon | 709/228 |
| 7,159,014 | B2 * | 1/2007 | Kausik et al. | 709/217 |
| 7,240,283 | B1 * | 7/2007 | Paila et al. | 715/205 |
| 7,346,843 | B2 * | 3/2008 | Hind et al. | 715/234 |
| 2003/0061272 | A1 * | 3/2003 | Krishnamurthy et al. | 709/203 |
| 2003/0135547 | A1 * | 7/2003 | Kent et al. | 709/203 |
| 2003/0212887 | A1 * | 11/2003 | Walther et al. | 713/151 |
| 2003/0217147 | A1 * | 11/2003 | Maynard et al. | 709/225 |

(Continued)

OTHER PUBLICATIONS

Ari Luotonen, Cern, and Kevin Altis, Intel World-Wide Web Proxies Apr. 1994.*

(Continued)

*Primary Examiner* — Jason Liao
*Assistant Examiner* — Berhanu Mitiku
(74) *Attorney, Agent, or Firm* — Finnegan, Henderson, Farabow, Garrett & Dunner, LLP

(57) ABSTRACT

A page structure may be used to begin validation of an embedded resource prior to the time a browser issues a request to validate the embedded resource. A page structure includes information indicating one or more embedded resources in the web page and, in some implementations, its corresponding cache characteristics. The page structure may be used to generate a validation message that indicates resources to be validated. The validation message may be sent to a server at substantially the same time that the browser begins rendering the web page. The server can then begin validating the resources indicated in the validation message by sending validation requests to an origin or other server storing the embedded resources. The server then may send the validation responses back to the client computer executing the browser so that the validation responses can be used to satisfy corresponding validation requests generated by the browser.

24 Claims, 9 Drawing Sheets

(56) References Cited

U.S. PATENT DOCUMENTS

| | | | |
|---|---|---|---|
| 2004/0010543 A1* | 1/2004 | Grobman | 709/203 |
| 2004/0068579 A1* | 4/2004 | Marmigere et al. | 709/242 |
| 2005/0015442 A1* | 1/2005 | O'Laughlen et al. | 709/203 |
| 2005/0027820 A1* | 2/2005 | O'Laughlen et al. | 709/217 |
| 2005/0182826 A1* | 8/2005 | Knittel et al. | 709/219 |

OTHER PUBLICATIONS

Daniel Anderson, and Tao Yang Multiprocessor scheduling with client resources to improve the response time of WWW applications Jul. 1997, Procedings of the 11$^{th}$ international conference on Supercomputing ICS'97 ACM Press.*

Andrea Carol Arpaci-Dusseau Implicit coscheduling: Coorinated scheduling with implicit information in distributed systems Aug. 2001 ACM Transactions on Computer Systems (TOCS), vol. 19 Issue 3 Publisher: ACM Press.*

Tao et al. "Automatic Hidden-Web Table Interpretation by Sibiling Page Comparison" 26th International Conference on Conceptual Modeling pp. 566-581, Aucland, New Zealand, Nov. 5-9, 2007.*

* cited by examiner

```
<table width="770" cellpadding="0" cellspacing="0" border="0" bgcolor="#ffffff">
<tr>
<td width="202" rowspan="3" valign="bottom">
<a href=""><img src="http://i.a.cnn.net/cnn/.element/img/1.1/logo/logo.gif"></a></td>
```

FIG. 2B

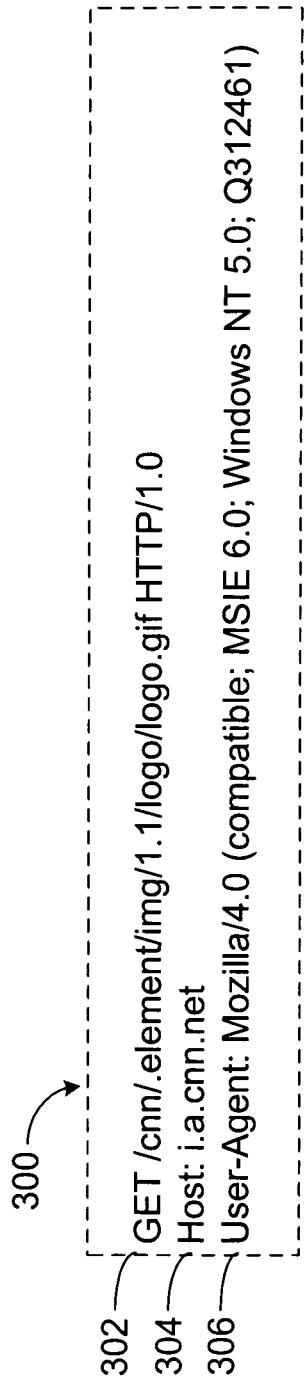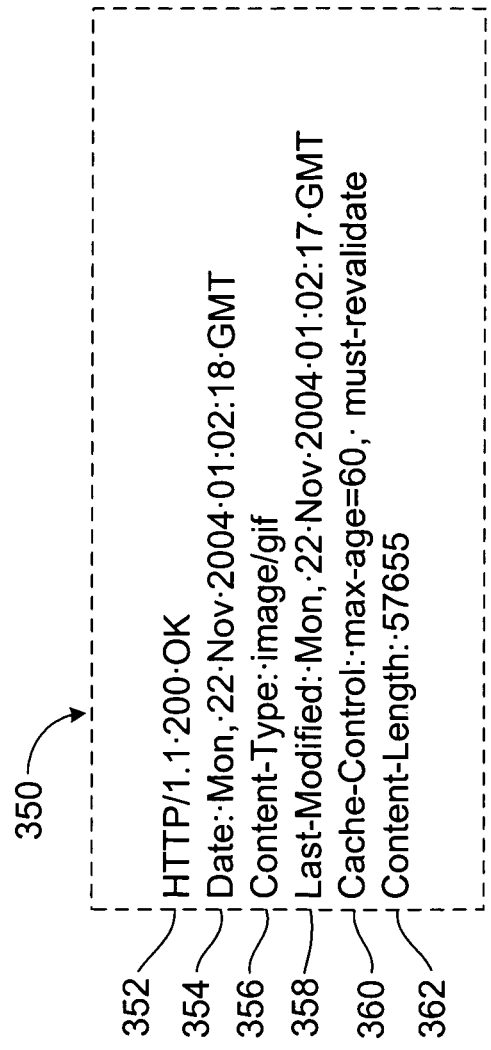
FIG. 3A
FIG. 3B

REDUCING LATENCIES IN WEB PAGE RENDERING

CLAIM OF PRIORITY

This application is a continuation in part of U.S. patent application Ser. No. 11/025,842, filed Dec. 30, 2004 now abandoned, titled "Reducing Latencies In Web Page Rendering," and which claims priority under 35 USC §119(e) to U.S. Patent Application Ser. No. 60/566,174, filed on Apr. 29, 2004. The entire contents of both applications are hereby incorporated by reference.

TECHNICAL FIELD

This description relates to reducing latencies in web page rendering.

BACKGROUND

In order to speed up the experience of browsing the World Wide Web, the HTTP protocol supports the use of local caching. See "HyperText Transfer Protocol—HTTP/1.1," RFC 2616 (available on the world wide web at w3.org/Protocols/rfc2616/rfc2616.html). Generally, a client (i.e., the device requesting an object) maintains copies of resources in a local cache so that the resources can be used to satisfy future requests without the need to retrieve the objects from the origin server (i.e., the server that provides the object). Intermediate servers (i.e., servers in the HTTP response-request chain in-between the client and origin server) also may maintain copies of resources in an associated cache. The cached resources may be, for example, a web page (e.g., a hypertext mark-up language (HTML) document or "top page") or the resources embedded in a web page (e.g., images, style sheets, or Javascript files). As part of the HTTP protocol, an origin server can set a time (generally referred to as the expiration time) until which a cacheable object remains valid, i.e., until which the object will remain unchanged and, therefore, until which the cached object can be used. When the expiration time has been reached, the cache may attempt to simply validate the cached object (e.g., by verifying with the origin server that the cached object is unchanged) to enable further use of the cached resource. The HTTP protocol has additional mechanisms that cause a client to validate a cached resource before using it. For example, an HTTP server can force a cache to validate cached resources after they become stale by using the "must-revalidate" cache-control directive of the HTTP protocol (see section 14.9 of the HTTP 1.1 protocol).

SUMMARY

In one general aspect, to validate embedded resources in a web page, a validation message is sent by a client system executing a web browser. The validation message identifies at least one resource embedded in a web page and is sent prior to the web browser issuing a validation request for the embedded resource. The validation message is received from a client system, for example, by a traffic server (e.g., a caching web proxy). The traffic server generates a request to validate the embedded resource identified in the validation message and sends the request to validate the embedded resource to a server. In response to the request sent to the server, a validation response is received, for instance, by the traffic server. The traffic server sends the validation response to the client system to provide the validation response to the web browser rendering the web page to satisfy a request issued by the browser to validate the embedded resource.

Implementations may include one or more of the following features. For example, the request to validate the embedded resource may include a conditional-GET. The validation message may be received in a single message.

Multiple validation messages may be received from one or more client systems by, for example, the traffic server. The traffic server may generate an aggregate page structure by determining common embedded resources among the multiple validation messages and may prioritize the request to validate the embedded resource based on the validation message sent by the client system and the aggregate page structure.

Alternatively, or additionally, the traffic server may generate or designate an aggregate page structure by determining which one of the multiple validation messages was most recently received. A determination to send the request to validate the embedded resource may be made based on a union of the aggregate page structure and the validation message sent by the client system.

In another general aspect, to validate embedded resources in a web page, a page structure may be generated, for example, by a client system. The page structure corresponds to a web page and indicates at least one resource embedded in the web page. The client system generates a validation message based on the page structure. The validation message identifies the embedded resource and is sent to a first server prior to a web browser issuing a request to validate the embedded resource. A validation response for the embedded resource is received by the client system from the first server. The validation response is provided to a web browser rendering the web page to satisfy a request to validate the embedded resource issued by the web browser.

Implementations may include one or more of the following features. For example, requests for embedded resources in the web page may be sent by the client system during an initial rendering of the web page. The page structure may be generated based on responses received in response to the requests for embedded resources sent during the initial rendering of the web page.

The page structure may be updated based on responses received in response to requests for embedded resources sent during a subsequent rendering of the web page. Alternatively, or additionally, the page structure may be updated based on a sibling web page. For instance, the page structure corresponding to the web page may be updated based on responses received in response to requests for embedded resources sent during a rendering of the sibling web page. The sibling web page may be determined by determining whether a URL for the web page is similar to a URL for a second web page based on canonicalizing the URL for the web page and the URL for the second web page. When the URL for the web page is determined to be similar to the URL for the second web page, a differential mapping may be performed between the page structure corresponding to the web page and a page structure corresponding to the second web page to determine if similarities between the page structures exceed a threshold.

The first server may include a traffic server (which, e.g., may be a customized HTTP proxy server) on a ISP network. The validation message may be sent to the first server substantially simultaneous to receiving a request for the web page from the web browser. A single validation message may be generated. The validation message may identify the embedded resource by indicating a URL for the embedded resource. The page structure may only indicate cacheable embedded resources of the web page. Cached copy of embedded resources identified in the validation message may already be stale when the validation message is generated, or will become stale at a set time in the future when the validation message is generated.

The first server may send a request to validate the embedded resource identified in the validation message to a second server and the validation response received from the first server may include a validation response received by the first server from the second server.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DESCRIPTION OF DRAWINGS

FIG. 2B shows a portion of web page code that corresponds to the web page shown in FIG. 2A.

FIG. 3A is an illustration showing an example of an HTTP request.

FIG. 3B is an illustration showing a portion of an HTTP response to the HTTP request shown in FIG. 3A.

DETAILED DESCRIPTION

Figure 1:
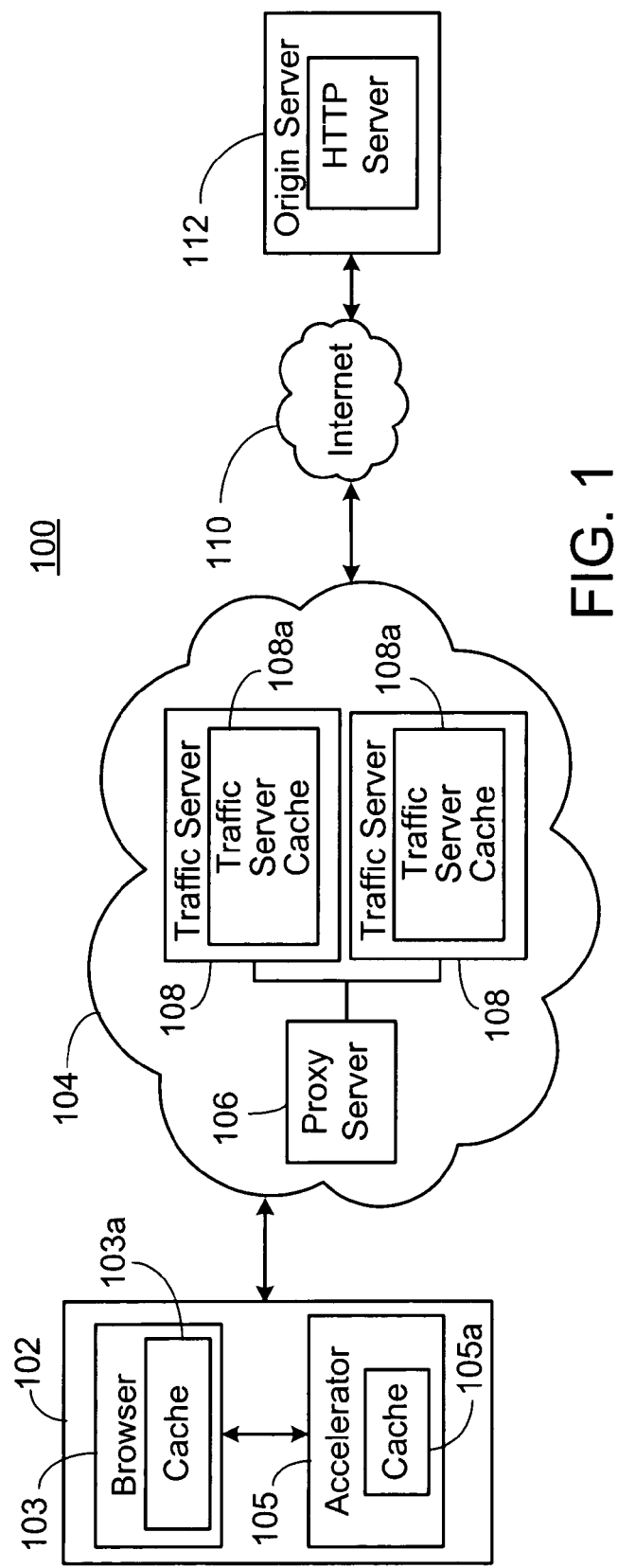
FIG. 1 is a diagram showing a networked system that supports the HTTP protocol with local caching and validation.

Latencies in rendering a web page and embedded resources may be reduced by beginning the process of validating cached resources embedded in the web page prior to the time the browser issues a request to validate the embedded resources. A web browser may execute on a client system and request and render a web page. Resources embedded in the web page may be stored in a browser cache for use during subsequent renderings of the web page. Some of the cached resources, however, may become stale prior to a subsequent rendering of the web page. Consequently, during a subsequent rendering, the browser may issue validation requests for the stale cached resources.

To reduce latencies in rendering a web page, a page structure may be used to begin validation of an embedded resource prior to the time the browser issues a request to validate the embedded resource. A page structure includes information indicating one or more embedded resource in the web page and, in some implementations, its corresponding cache characteristics. For example, the page structure may include the URLs corresponding to cacheable resources embedded in the web page and their corresponding cache characteristics. A page structure may be generated, for example, when the web page is first requested and rendered.

The next time the browser renders the same web page, the page structure may be used to generate a validation message that indicates resources to be validated. For example, when the page structure includes cacheable, embedded resources and their cache characteristics, the page structure may be used to generate a single validation message that indicates the cacheable resources that currently need to be validated. The indications of the resources in the validation message may be compressed or otherwise represented in a compact form.

The validation message may be sent to a server prior to the web browser issuing a validation request for the embedded resource (e.g., at substantially the same time that the browser makes the request for the web page or begins rendering the web page). The server can then begin validating the resources indicated in the validation message by sending validation requests to an origin or other server storing the embedded resources. The server then may send the validation responses back to the client computer executing the browser so that the validation responses can be used to satisfy corresponding validation requests generated by the browser.

By sending a validation message around the time that the browser makes the request for the web page or begins rendering the web page (particularly when a single validation message is used), the process for validating a resource in the browser cache is started before the instant at which the browser issues a request to validate the resource, leading to increased page rendering speed. Furthermore, sending a single validation message reduces the number of TCP connections needed between the client and ISP network for validation and, also, thereby reduces the number of HTTP requests sent to ISP network. Such a reduction in the number of TCP connections to process validation requests eliminates the latency associated with the TCP connections not made and results in a corresponding reduction in the number of bytes associated with the reduced number of required HTTP headers, and thus also may contribute to an increase in page rendering speed. Similarly, compressing the resources indicated in the validation message may result in a reduction of the number of bytes sent to ISP network, which may contribute to increasing the page rendering speed.

Referring to FIG. 1, a networked system 100 supports the HTTP protocol with local caching and validation. System 100 includes a client computer 102 connected to, e.g., an ISP network 104. ISP network 104 is connected to the Internet 110, which is connected to an origin server 112.

Client computer 102 executes a hypertext transfer protocol (HTTP) web browser 103. A web browser is generally a client software program that is capable of rendering various kinds of resources available on a network such as the Internet. Web browser 103 includes a local browser cache 103a for caching resources (such as web pages and resources embedded in web pages) received, e.g., from origin server 112.

Client computer 102 also executes an accelerator 105, which includes a local accelerator cache 105a for caching resources such as web pages and resources embedded in web pages, along with other items (such as page structures). Accelerator 105 also assists in reducing latencies in rendering resources (such as web pages) that include cacheable, embedded resources.

ISP network 104 includes a load-balancing proxy server 106 connected to one or more traffic proxy servers 108 (which, e.g., are custom HTTP proxy servers that process the previously described validation messages). Traffic proxy servers 108 also include a traffic server cache 108a for caching resources and may cooperate with accelerator 105 to assist in reducing latencies in rendering resources that include cacheable, embedded objects or other resources (as described further below).

Origin server 112 may execute HTTP server software to respond to data requests from the HTTP-based web browser 103. The HTTP data requests from browser 103 can target various types of resources on server 112, such as documents (e.g., web pages) or objects (e.g., images, style sheets, Javascript files, executable files, audio files, or video files).

In general, browser 103 may be used to navigate to a particular web page, for example, through the entry of a Uniform Resource Locator (URL) into a navigation bar of web browser 103 or selection of a hyperlink in another web page. When the web page is not cached in browser cache 103a, accelerator cache 105a, or traffic server cache 108a, the request is forwarded from web browser 103 to origin server 112 through accelerator 105, proxy 106, and one of traffic servers 108. Origin server 112 then may return the requested web page to browser 103 through the traffic server 108, proxy server 106, and accelerator 105. Web browser 103 renders the received web page. For subsequent requests for the web page by browser 103, accelerator 105 and traffic server 108 may operate to reduce latencies in the rendering of the web page, as described further below.

Figure 2A:
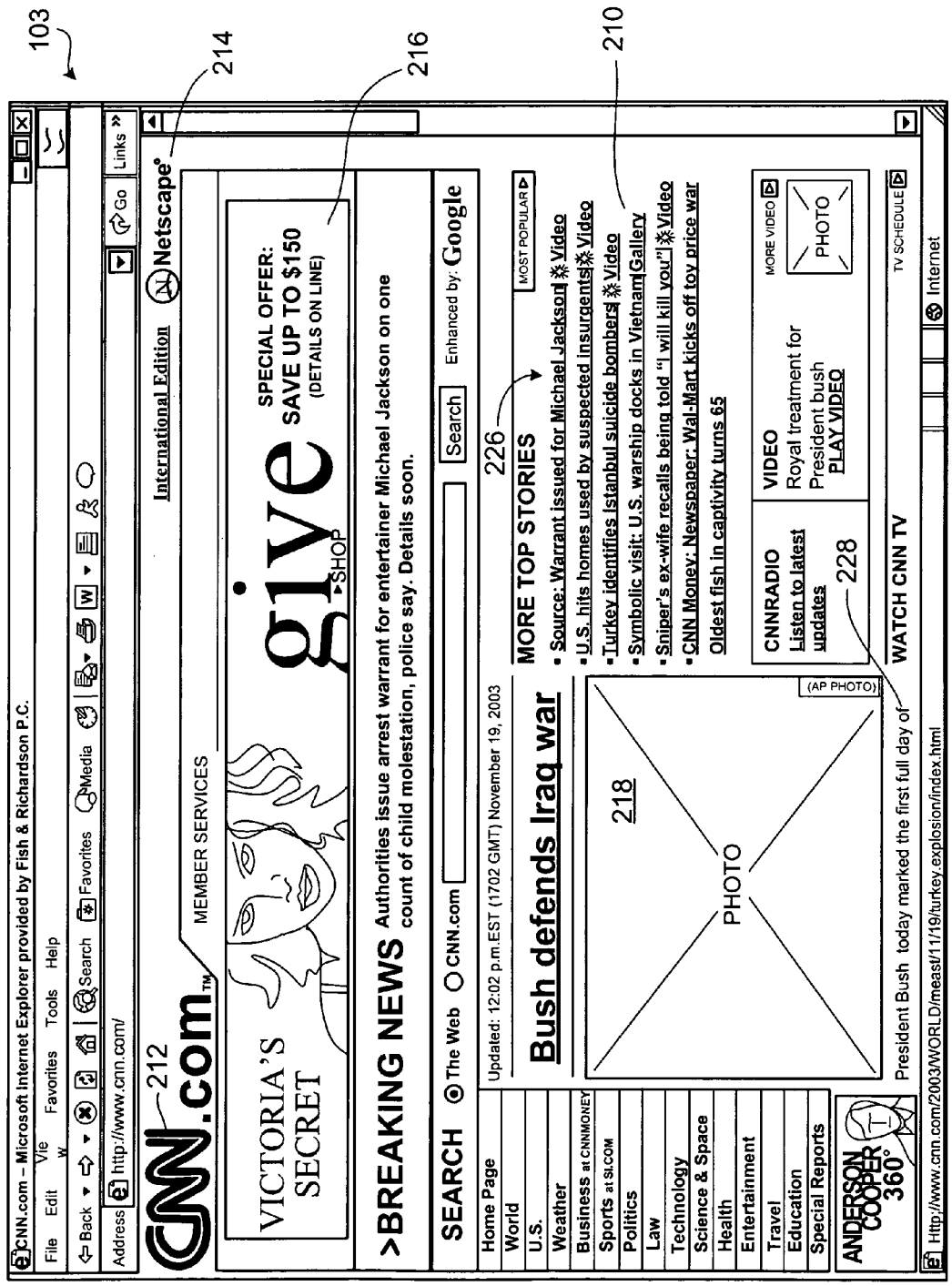
FIG. 2A is an illustration showing a web browser interface configured to display a web page.

Referring to FIG. 2A, web browser 103, e.g., receives and renders web page 210. The term web page as used herein refers generally to documents and other resources capable of being read and rendered by a browser.

Web page 210 is composed of text, hyperlinks and a number of embedded objects or other resources, such as embedded graphics. For example, web page 210 includes graphics 212-218, hyperlinks 226, and text 228. While not shown, the embedded objects or other resources also can include, e.g., audio files, video files, executable files, other web pages, style sheets, Javascript files, or other resources.

Web pages are typically text files written in a standard or proprietary language that is understood by browser 103. Some standard languages include HTML and the extended mark-up language (XML). The text file (otherwise referred to as web page code) constitutes instructions to the web browser 103 as to what browser 102 should do to render the web page and embedded resources in the web page. Web browser 103 processes the web page code (e.g., a HTML text document), fetches the embedded resources, and renders the web page and embedded resources to the user accordingly. While the term rendering normally connotes converting from a file into a visual form, when a browser renders some embedded resources, their rendering may result in non-visual components of the web page. For example, Javascript may result in non-visual components of the web page. Accordingly, the term rendering should be understood to more broadly include the browser's processing of a resource, whether the processing results in visible components or non-visible components.

The text and hyperlinks for a web page typically are included in the web page code. By contrast, graphics and other embedded resources typically need to be retrieved when browser 103 renders a web page. The web page code includes instructions that direct browser 103 to the location of the embedded resources to be loaded (typically located on the server that provided the web page code). As browser 103 encounters the instructions in the web page code, browser 103 uses the instructions to retrieve the embedded resources and render the resources in the web page. The web page code and retrieved resources may be cached in browser cache 103a or accelerator cache 105a for use in subsequent renderings of the web page by browser 103. The web page code and retrieved resources also may be cached in traffic server cache 108a for use in subsequent renderings of the web page by browser 103 or other browsers.

FIG. 2B shows a portion 230 of web page code that corresponds to web page 210. The web page code for rendering web page 210 is written in HTML. HTML consists of text "tags" that provide browser 103 with certain information and instruct the browser 103 how to display that information. A tag is text surrounded by the brackets "< >." In the example provided by portion 230, tags 232-236 primarily instruct browser 103 as to where browser 103 is to display graphic 212. Tags 238a and 238b instruct browser 103 to display graphic 212 and to hyperlink graphic 212 to a particular web page (in this case, graphic 212 is hyperlinked to web page 210). The anchor tag 238a, <a>, instructs browser 103 to create the hyperlink. The image tag 238b, <img>, instructs browser 103 to insert graphic 212. Image tag 238b includes the location of graphic 212 as an argument. The location of the graphic 212 is expressed as a URL 240.

URL 240 is an embedded URL and corresponds to an embedded object in web page 210, namely, graphic 212. Other URLs also may be embedded in the web page code and may correspond to objects or other resources (visible or non-visible) embedded in web page 210.

URL 240 includes several sections that identify the location of graphic 212. A first section 242 indicates that graphic 212 is located at a server whose domain name is "i.a.cnn.net." First section 242 also indicates that graphic 212 is available at the server via the HTTP protocol. A second section 244 indicates the directory location of graphic 212 on the server. A third section 246 indicates the filename of graphic 212, namely, "logo.gif."

Using the URL 240 and the domain name system (DNS), graphic 212 can be retrieved from the origin server (e.g., origin server 112) and rendered. For example, web browser 200 can send a request (e.g., an HTTP request) to traffic server 108. The request includes URL 240 and traffic server 108 uses the DNS to determine the address of origin server 112 and location of graphic 212 on the origin server 112. Traffic server 108 then sends a request (e.g., HTTP request) to origin server 131 for graphic 212. Origin server 112 sends a response that includes graphic 212 to traffic server 108, which forwards graphic 212 to browser 103 such that browser 103 can then render graphic 212 in web page 210.

Referring to FIG. 3A, an example of an HTTP request 300 for graphic 212 includes a structured sequence of fields 302-306. Each field 302-306 includes an HTTP header and data associated with the header. For example, field 302, which may be referred to as the start line, includes the phrase "GET," which indicates that the HTTP request uses the "GET" method and also includes the filename and location of graphic 212 on the origin server, namely, "/cnn/.element/img/1.1/logo/logo.gif." In field 304, header "Host:" indicates the origin server from which graphic 212 is to be obtained. In request 300, the server is the server whose domain is "i.a.cnn.net." Field 306 includes the HTTP header "User-Agent:." The data of field 306 is "Mozilla/4.0 (compatible; MSIE 6.0; Windows NT 5.0; Q312461)," which designates the type of browser generating the request 300.

Referring to FIG. 3B, an HTTP response 350 to request 300 may include a structured sequence of fields 352-362 and graphic 212 (not shown in FIG. 3B). Field 352 includes an indication of the version of the HTTP protocol ("HTTP/1.1") and a status code ("200 OK") that reflects the result of the origin server's or an intermediate server's attempt to satisfy request 300. A status code of "200 OK" indicates the attempt was successful. Field 354 indicates the date and time response 350 was generated. Field 356 indicates the media-type of the data or object (in this case, graphic 212) returned by response 350. In the case of graphic 212, the media-type is "image/gif," which indicates that the object is an image in the "gif" format. Field 358 indicates the date and time that graphic 212 was last modified or changed. Field 362 indicates the length of the data or object (graphic 212) returned by response 350.

Field 360 indicates cache characteristics of the object (graphic 212) returned by response 350. Field 360 includes cache directives from the server that provided response 350. The cache directives indicate how caches in the request-response chain (e.g., browser cache 103a, accelerator cache 105a, and traffic server cache 108a) are suppose to handle caching of graphic 212 and subsequent requests for the graphic 212. The "max-age" directive indicates the time in seconds from the time the response containing the object is generated until the cached version of graphic 212 becomes stale. The "must-revalidate" directive forces a cache (assuming the cache follows the HTTP 1.1 specification) to immediately mark graphic 212 as stale.

Figure 4A:
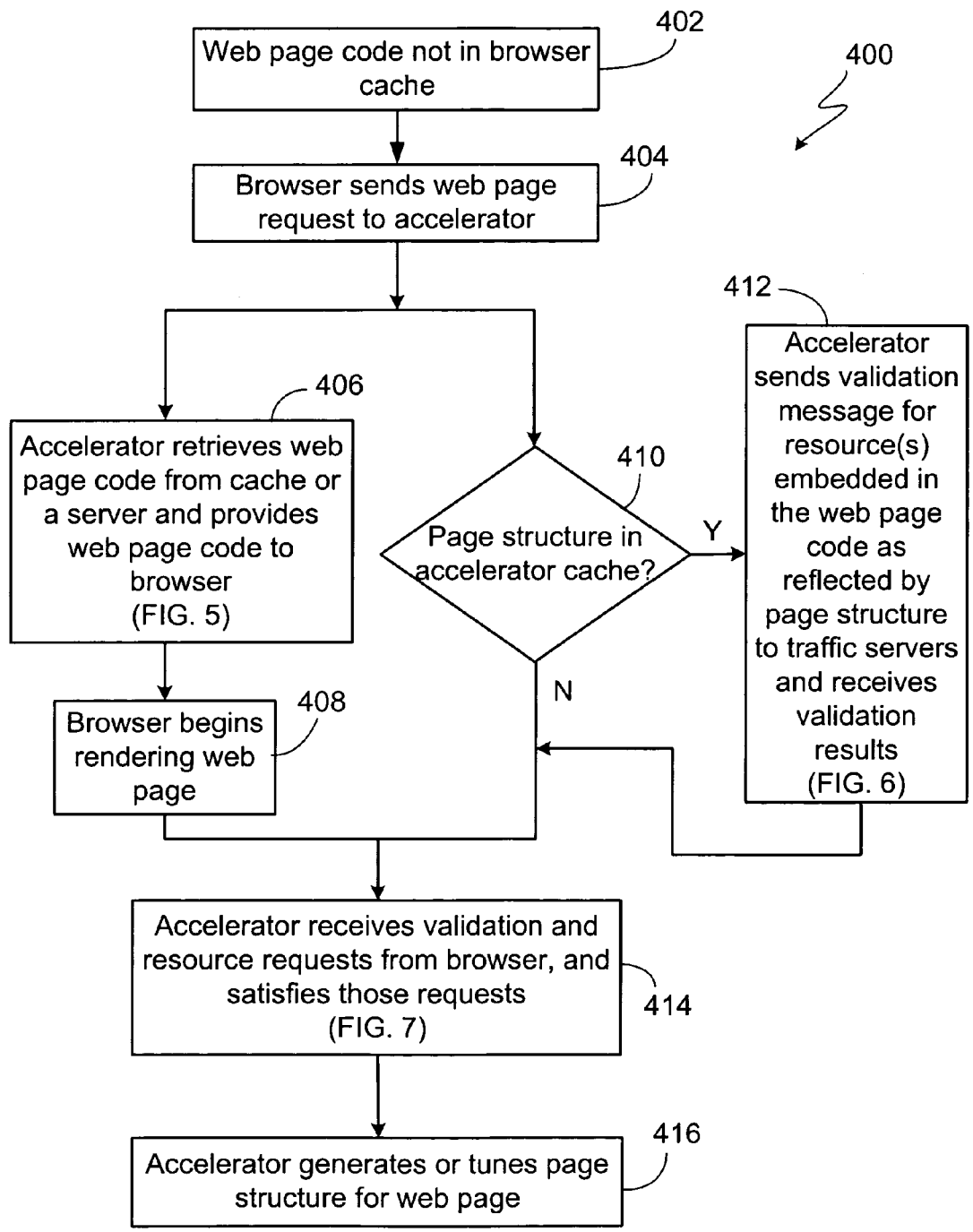
FIG. 4A show a diagram illustrating a process that may be implemented in the system of FIG. 1 to assist in reducing latencies in rendering a web page.

Referring to FIG. 4A, a process 400 may be implemented in system 100 to assist in reducing latencies in rendering a web page stored, for example, on origin server 112. When web browser 103 is used to navigate to a web page stored on origin server 112 and browser cache 103a is clear of the corresponding web page code (402), a request directed to origin server 112 is sent from web browser 103 to accelerator 105 (404).

When accelerator 105 receives the request for the web page, accelerator 105 retrieves the corresponding web page code and provides the web page code to browser 103 (406). Accelerator 105 may retrieve the corresponding web page code from accelerator cache 105a when there is a fresh or validated copy in accelerator cache 105a, or from origin server 112 or other cache (e.g., maintained at traffic server 108) in the absence of a fresh or validated copy in accelerator cache 105a.

Figure 5:
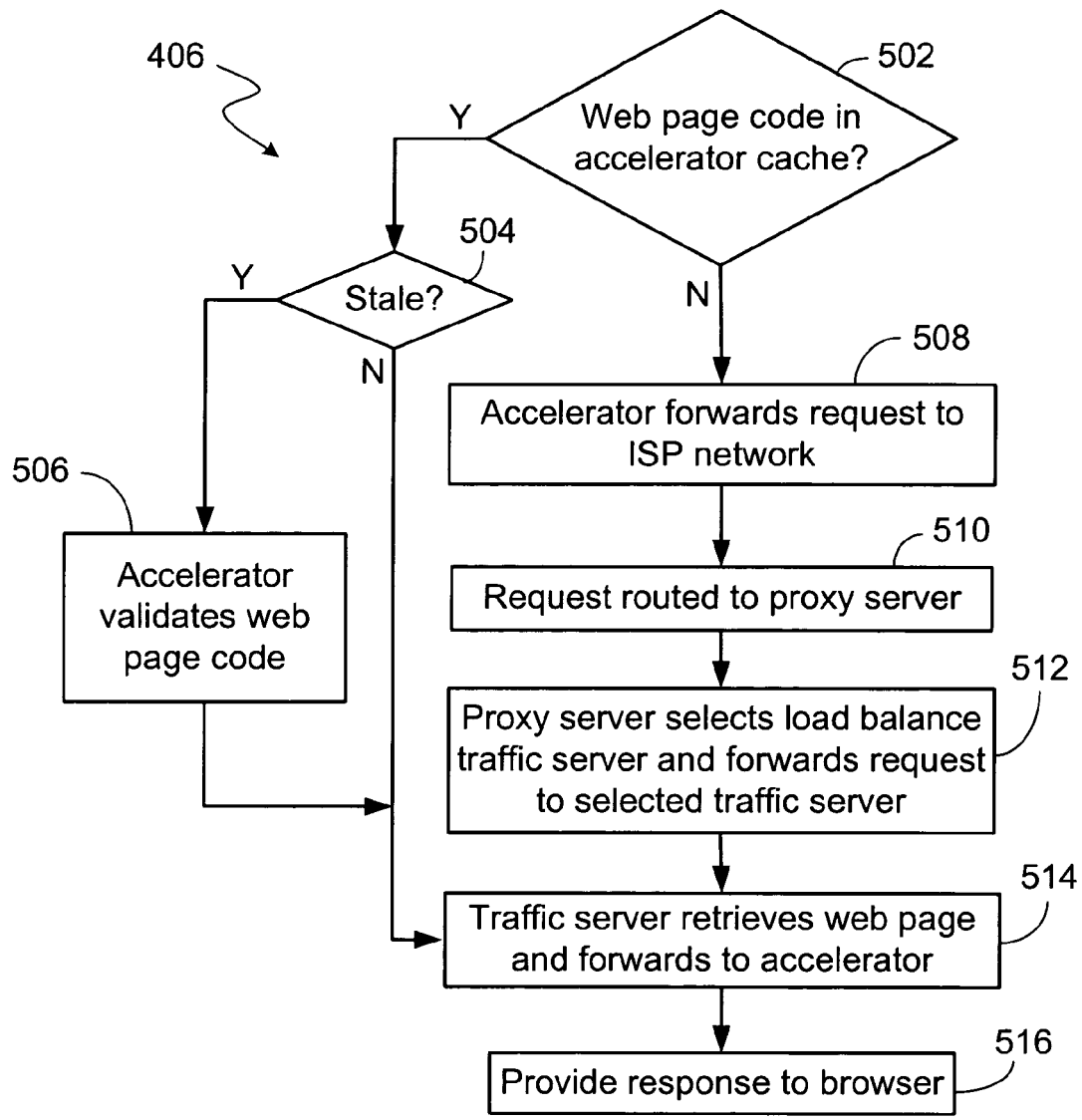
FIGS. 5-7 show diagrams that illustrate processes that may be used to implement actions in the process shown in FIG. 4A.

Referring to FIG. 5, more specifically, when accelerator 105 receives the request, it first checks to see if a cached copy of the web page is available in accelerator cache 105a (502).

If a cached copy is available (502), a determination is made whether the copy is stale (504). When not stale (504), accelerator 105 provides a response to browser 103 that includes the cached copy to satisfy the browser's request (516). On the other hand, when the web page code in accelerator cache 105a is stale (504), accelerator 105 validates the web page code (506). For instance, to validate the web page code (506), accelerator 105 may send a conditional-GET request for the web page code to origin server 112 or other server on which the web page code is located and the conditional-GET request may follow the same path to origin or other sever 112 as a standard GET request for the web page or other resource. In the HTTP protocol, a conditional-GET has an If-Modified-Since header that includes, e.g., the expiration time of the resource or the time in a Last-Modified header included in the response that originally provided the resource. If the resource has not been modified since the time specified in the If-Modified-Since header, the resource will not be sent back. Instead a 304 (Not-Modified) response with only the relevant resource meta-information headers (e.g., a new expiration time) will be returned. If the resource has been modified, a 200 (OK) response that includes the modified resource will be sent back. If the resource no longer exists, a 404 (File-Not-Found) response is returned. In the absence of a File-Not-Found response, accelerator 105 provides a response to browser 103 that either includes the newly-received web page code (if an OK response is returned) or the cached copy originally stored in accelerator cache 105a (if a Not-Modified response is returned) (516).

While the foregoing describes techniques that use the last-modified or expiration times for validating an object, other validators may be used. For instance, entity tags (etags) may be used for validation as an alternative, or in addition to, last-modified times or expiration times.

If no cached copy of the web page code is available in accelerator cache 105a (502), accelerator 105 forwards the request to ISP network 104 (508) to retrieve the web page code from origin server 112 (or a cached copy of the web page from traffic server 108). The request is routed to proxy server 106 (510), which load balances requests among one or more traffic servers 108 by selecting a traffic server 108, as appropriate, to balance the load on traffic servers 108, and forwarding the request received from client computer 102 to the selected traffic server 108 (512).

After receiving the forwarded request, the selected traffic server 108 checks to determine if a traffic server cache 108a contains a copy of the web page code. If traffic server cache 108a contains a copy of the web page code and the copy is fresh, traffic server 108 retrieves the web page code from traffic server cache 108a and provides a response to browser 103 that includes the web page code. If traffic server cache 108a contains a copy of the web page code, but the copy is stale, traffic server 108 may validate the web page code and provide a response to browser 103 that contains a validated copy of the web page code.

If traffic server cache 108 does not contain a copy of the web page code, traffic server 108 forwards the request to origin server 112 to retrieve the web page code from origin server 112. When traffic server 108 receives the web page code from origin server 112, traffic server 108 forwards the web page code to accelerator 105 through proxy server 106 (514). Accelerator 105 then provides a response to browser 103 that includes the web page code received from traffic server 108 (516).

Referring again to FIG. 4A, when browser 103 receives the web page code from accelerator 105 (406), browser 103 begins rendering the web page (408), sending requests for the embedded resources in the web page and/or requests for validation of resources embedded in the web page to accelerator 105.

All the while, and upon receipt of a browser request for the web page or validation of one or more resources embedded therein (404), accelerator 105 determines whether a page structure associated with the web page is stored in accelerator cache 105a (410). For example, the requested web page's URL may be used as an index to perform a cache lookup for an associated page structure stored in accelerator cache 105a. While operations 406 and 410 are shown such that they are performed asynchronously, these operations may be performed in a more sequential manner. For instance, accelerator 105 may first check for a cached version of the requested web page in accelerator cache 105a before performing operation 410. Providing a cached version of the requested web page to browser 103 may significantly reduce latency, and therefore, the check for a cached version in accelerator cache 105a (406) may be given priority over operation 410 to insure that the benefits from providing the cache copy are achieved.

Figure 4B:
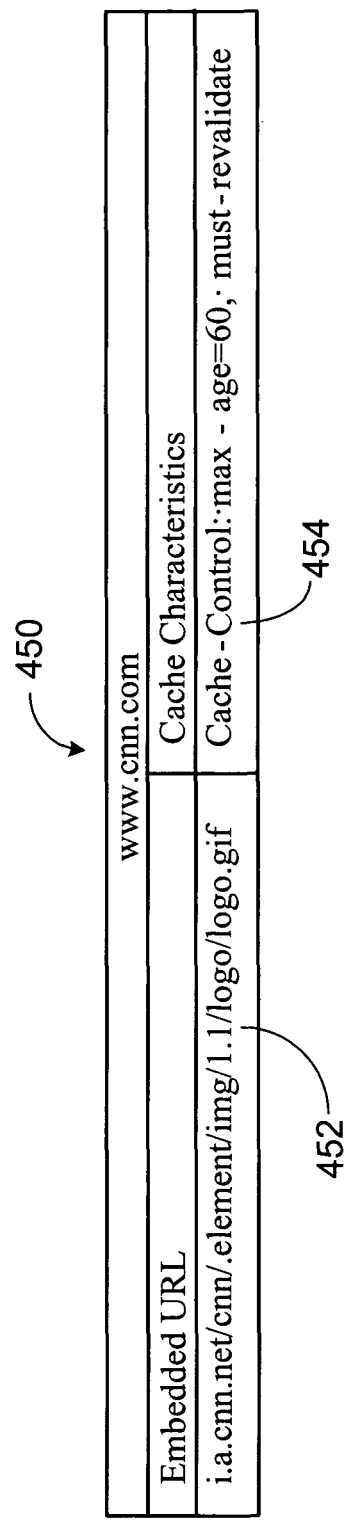
FIG. 4B shows an example of a portion of a page structure for a web page.

Referring to FIG. 4B, a page structure 450 identifies one or more embedded resources within a web page and cache characteristics associated with the embedded resources, such as the expiration time (which indicates when the resource is presumed to become stale) or other validators (e.g., last-modified time or etag), or an indication that the resource must always be validated. In one implementation, the page structure includes only a subset of the resources embedded within a web page, such as the embedded resources that are cacheable, along with their corresponding cache characteristics.

A page structure also may include other information pertinent to a request for a resource (not shown in FIG. 4B), such as personalization information. For example, some URLs point to a resource, but the particular resource returned depends on other information included in the request for the resource, such as information added to the request from a cookie. For instance, there may be web page code that is in one language and web page code that is in another language. Which web page code is returned in response to a request for the web page may depend on demographic information added to the request from a cookie. Thus, for example, if the added information indicates the browser is located in an English speaking country, an English version of the web page may be returned, while a browser in a French speaking country may receive a French version of the web page. The alternate language selection may be controlled by data in an "Accept-Language" header.

A page structure may be organized by associating the URLs of the embedded resources with the URL of the web page. Accordingly, a page structure may include URLs corresponding to cacheable resources embedded in the web page, with the URLs associated with the cache characteristics (and possibly other information such as cookies) of those resources. As described further below, a page structure may be generated based on the requests made and corresponding responses received when a web page is rendered.

FIG. 4B shows an example of a portion of a page structure 450 for web page 210. As shown, page structure 450 includes the embedded URL 402 corresponding to graphic 212, and the corresponding cache characteristics 404 as indicated in a HTTP response containing graphic 212 or a validation response to validate graphic 212.

Referring again to FIG. 4A, if accelerator 105 finds in accelerator cache 105a a page structure associated with the requested web page (410), accelerator 105 uses the page structure to identify resources embedded within a requested web page that will presently require validation by a rendering browser, and thus, to generate validation message(s) corresponding to those identified resources), which are sent to traffic servers 108 (412).

As such, accelerator 105 may identify requests for validation that will be issued by a browser seeking to render the web page before the browser encounters those resources in the web page code, thus enabling advanced processing of those validation requests. Generally, the validation message indicates embedded resources of the web page (e.g., indicates the URLs of embedded resources) and is sent to traffic server 108 prior to browser 103 issuing validation requests for the embedded resources (e.g. the validation message is sent with a request for the web page or around the time browser 103 begins rendering the web page). Traffic servers 108 use the validation message to validate at least a portion of the indicated resources, and return the validation results to accelerator 105 (412).

Figure 6:
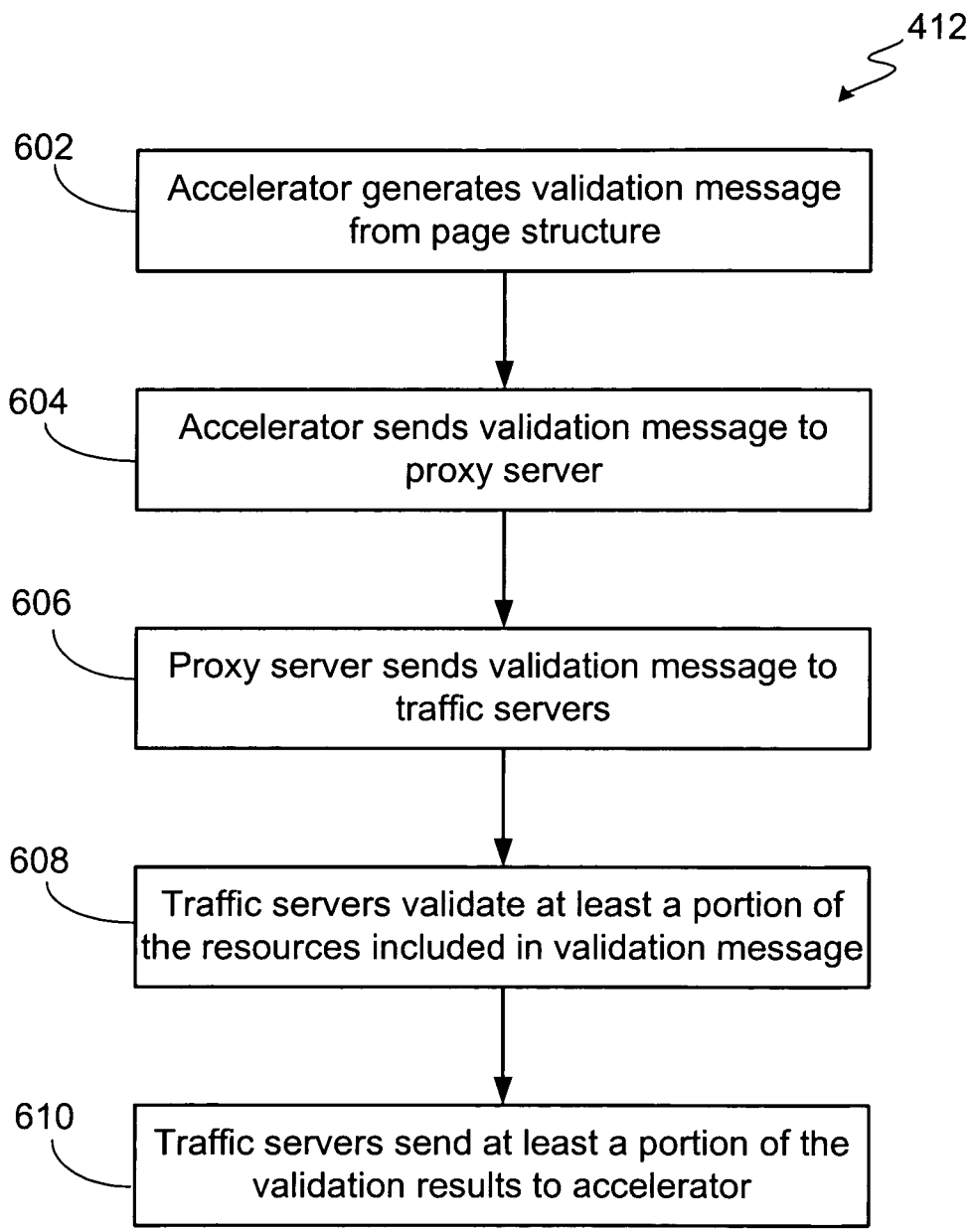

Referring to FIG. 6, an exemplary process is described in greater detail to illustrate how accelerator 105 can send a validation message and receive responses thereto. Specifically, accelerator 105 uses the page structure to generate a validation message that includes all of the resources identified in the page structure or a subset of those resources (602). For instance, accelerator 105 may inspect the cache characteristics in the page structure to identify only those resources that currently require validation (i.e., those resources that have already grown stale) and generate a validation message based on a corresponding set of embedded resources, or it may be a less restrictive selection process, such as a process to generate a validation message that includes all of the embedded resources eligible for validation, including the resources that currently need validation and those resources that will need validation at some set time in the future, or accelerator 105 may simply forego a selection process altogether and simply submit all embedded resources in a validation message. In one example, the validation message may indicate the resources that currently need validation plus the resources that will expire within 30 minutes. Including resources that will expire at some time in the future may extend the life of those resources in accelerator cache 105a as a result of traffic servers 108 returning a new expiration time for the resource in the validation results. For instance, if a new expiration time is returned to accelerator 105 in response to a validation request for a resource (whether presently identified as stale or not), accelerator cache 105a may update the expiration time of the resource in accelerator cache 105a. Consequently, in a subsequent rendering of the web page, even if a cached resource were previously deemed by browser cache 103a to be stale (and possibly removed from browser cache 103a), accelerator cache 105a may nevertheless maintain a valid cached copy of the resource (because of the updated expiration time). As a result, when browser 103 issues a request for the resource (because the resource has been flushed from browser cache 103a) or issues a validation request for the resource (because the resource has been marked as stale in browser cache 103a), accelerator 105 may be able to respond appropriately with the resource or a validation response without the need to retrieve the resource from origin server 112 or other server and/or without the need to validate the copy of the resource in accelerator cache 105a. Moreover, accelerator 105 may identify updated expiration times, when determined, to browser 103 to enable more useful browser caching of resources whose expiration schedule changes.

As another alternative, accelerator 105 may generate a validation message that indicates all of the embedded resources in the web page, with or without the associated cache characteristics, and allows the traffic servers 108 to select which resources to validate (as described further with respect to action 608). When the validation message indicates all of the embedded resources and does not include cache characteristics, the page structure may not include the cache characteristics.

Validation messages may vary in substance or form. Substantively, for example, validation requests may vary with respect to the type and amount of information, such as personalization information, that is provided for the embedded resources for which validation is being requested. For instance, if the resource that is returned depends on information added to a request from a cookie, the information in the cookie (which may have been stored in the page structure, as described above) may be sent or referenced in the validation message also. In addition, with respect to substance, the validation message may indicate the resources by indicating the corresponding URLs for the resources, or may include some other identifier of the resources.

With respect to variations in form, validation messages may be submitted separately for each of several resources embedded within a web page, or they may be submitted in a single message. More specifically, accelerator 105 may generate a single validation message that indicates the embedded resources, and the single validation message may indicate the resources in a compressed or compact form so as to reduce the number of bytes needed for the message. By contrast, in some implementations, more than one validation message may be generated.

Accelerator 105 sends the validation message to proxy server 106 (604). Proxy server 106 may break down the received the validation message into one or more groups of resources indicated by the validation message (e.g., proxy server 106 may break down the validation message into one or more groups of URLs for the indicated resources) and distribute the validation load amongst one or more traffic servers 108 (606). By contrast, in an alternate implementation, proxy server 106 may forward the entire validation message to a traffic server 108 and let the traffic server 108 break down the validation message (606). In such a case, traffic server 108 may forward individual indications of the resources (e.g., the URLs of the resources) to other traffic servers 108 to further balance or more appropriately allocate the load. At 608, the appropriate traffic server(s) 108 then validates at least a portion of the resources indicated by the validation message by sending requests to the origin server 112, or other server (608). Some resources may be stored in traffic server cache 108a and valid. In such a situation, traffic server 108 may generate and return a validation response without sending a validation request to origin server 112 first.

To validate resources (608), traffic server 108 may send conditional-GET requests for the embedded resources to origin server 112 or other server on which the embedded resources are located. Traffic server 108 may obtain the time used in the If-Modified-Since header from previous responses received by traffic server, or the time may be included in the validation message. If validation is based on etags (e.g., using If-None-Match header), then traffic server may send an etag received in the validation message to origin server 112.

The particular resources selected from the validation message for validation by traffic server 108 may depend on the information and/or which resources are identified by the validation message. As described above, the validation message may include (1) only those resources that currently require validation, (2) those resources that currently require validation plus those resources that will require validation at a time in the future, or (3) all of the cacheable resources embedded in a web page, with or without their associated cache characteristics.

Several example scenarios are described to illustrate the various ways traffic server 108 may select resources identified in the validation request for validation, depending, in part, on the information provided in the validation message received by a traffic server 108 from accelerator 105. In one example, where the validation message indicates only those resources that currently require validation, or those that currently require validation plus those resources that will need validation at a time in the future, traffic servers 108 may validate all of the resources included in the validation request.

In another example, where the validation message indicates all of embedded resources and includes the associated cache characteristics, traffic servers 108 may select and validate the resources that have expired and/or those that will expire at some time in the future. In yet another example, where the validation message indicates all of the embedded resources but not the associated cache characteristics, traffic servers 108 may validate all of the indicated resources. In still another example, where the validation message indicates embedded resources without cache characteristics, traffic servers 108 may select and validate the resources that have expired and/or resources that will expire at some set time in the future if traffic servers 108 otherwise have the cache characteristics available (e.g., as a result of requests from other clients).

In some implementations, one or more traffic servers 108 may validate embedded resources through an inspection of additional information stored at traffic servers 108, before or as an alternative to sending requests to origin server 112, For instance, traffic servers 108 may store aggregate page structures or authoritative page structures for web pages and, during action 608, these server-based page structures may be used to optimize resource validation.

More specifically, traffic servers 108 generally process validation messages from multiple client computers and, therefore, have access to multiple validation messages for a given web page. Traffic servers 108 may use these multiple validation messages sent by various client machines to generate page structures and the type of page structure generated may depend on the particular web page requested.

Dynamic aggregate page structures may be generated for web pages having content that is dynamic or personal content or otherwise frequently changing. If the web page contains dynamic content (e.g., if the web page is personalized to the user or generated by a applet or a program), the embedded resources indicated in validation messages from different clients may be different for the same web page (or may be different even if they are from the same client if there is more than one user of the client). Similarly, because the validation messages are occurring at different times, the validation messages may be different because the web page has changed. As a result, over a number of validation messages received for a web page (e.g., a few thousand), traffic server 108 may determine the associated URLs that are common to the different validation messages and build a dynamic aggregate page structure based on the common URLs.

By contrast, static aggregate page structures may be generated for those pages whose content is not dynamic, personalized or otherwise frequently changing over time. As described, in general, traffic servers 108 process validation messages from multiple client computers and, therefore, have access to multiple page structure data. An authoritative page structure for a web page is based on the validation message that has the most recent timestamp from within a configured time frame (e.g. all the validation messages for a web page that traffic servers 108 receive in the last one hour are examined and the validation message with the latest time stamp is designated as the authoritative page structure—1 hour in this example is the configured time frame).

Both dynamic and static aggregate page structures may be used to optimize the validation requests sent by traffic server 108 to origin sever 112 (or other server). When the page is one that is personalized based, e.g., on information stored in a cookie or an output of a program (e.g., a dynamic page generated by a common gateway interface (CGI) program or Java Servlet), the dynamic aggregate page structure may be used to prioritize the resource validations indicated in the validation message. For instance, validation requests for resources in both the validation message and the dynamic aggregate page structure may be sent before the validation requests for resources that are not in both the validation message and the dynamic aggregate page structure. Conversely, when the page is not one that is personalized, then the union of the static aggregate page structure and the resources indicated in the validation message may be used to determine which resources to validate. For instance, if the client computer 102 sends a validation message with URL A to traffic server 108 to be validated, but the static aggregate page structure indicates that URL A does not exist, then traffic server 108 may not validate URL A. Alternatively, traffic server 108 may order the validations such that URL A is validated after the other resources.

At least a portion of the validation results are sent to accelerator 105 when they are received by traffic server 108 (610). As described previously, traffic servers may send a conditional-GET to validate the resources. In this case, traffic servers 108 generally receive one of three responses for each resource being validated: a Not-Modified response, an OK response including the modified resource, or a File-Not-Found response. These responses may be streamed back to accelerator 105 as they are received by traffic server 108.

Referring again to FIG. 4A, accelerator 105 provides responses to browser 103 to satisfy the validation requests and requests for embedded resources issued by browser 103 as browser 103 renders the web page (414). Generally, browser 103 issues (1) requests for embedded resources when browser cache 103a does not contain cached copies of those resources, and (2) validation requests when cached copies of the corresponding resources in browser cache 103a have expired and include a must-revalidate directive, or otherwise require validation (e.g., have expired without a must-revalidate directive).

With respect to requests for embedded resources, accelerator 105 satisfies these by providing a response that includes the resource from accelerator cache 105a when a valid copy of the resource is located in accelerator cache 105a (414), or by providing an appropriate response based on the validation results from traffic servers 108 when the cached copy in accelerator cache 105a is stale (414). Otherwise, if a cached copy of the resource is not stored in accelerator cache 105, accelerator 105 forwards the request to ISP network to retrieve the resource from origin server 112 or other server and provides the response to the forwarded request to browser 103 (414).

With respect to validation requests, accelerator 105 satisfies these by providing the appropriate response to the request based on the validation results received from traffic servers 108 (414).

Figure 7:
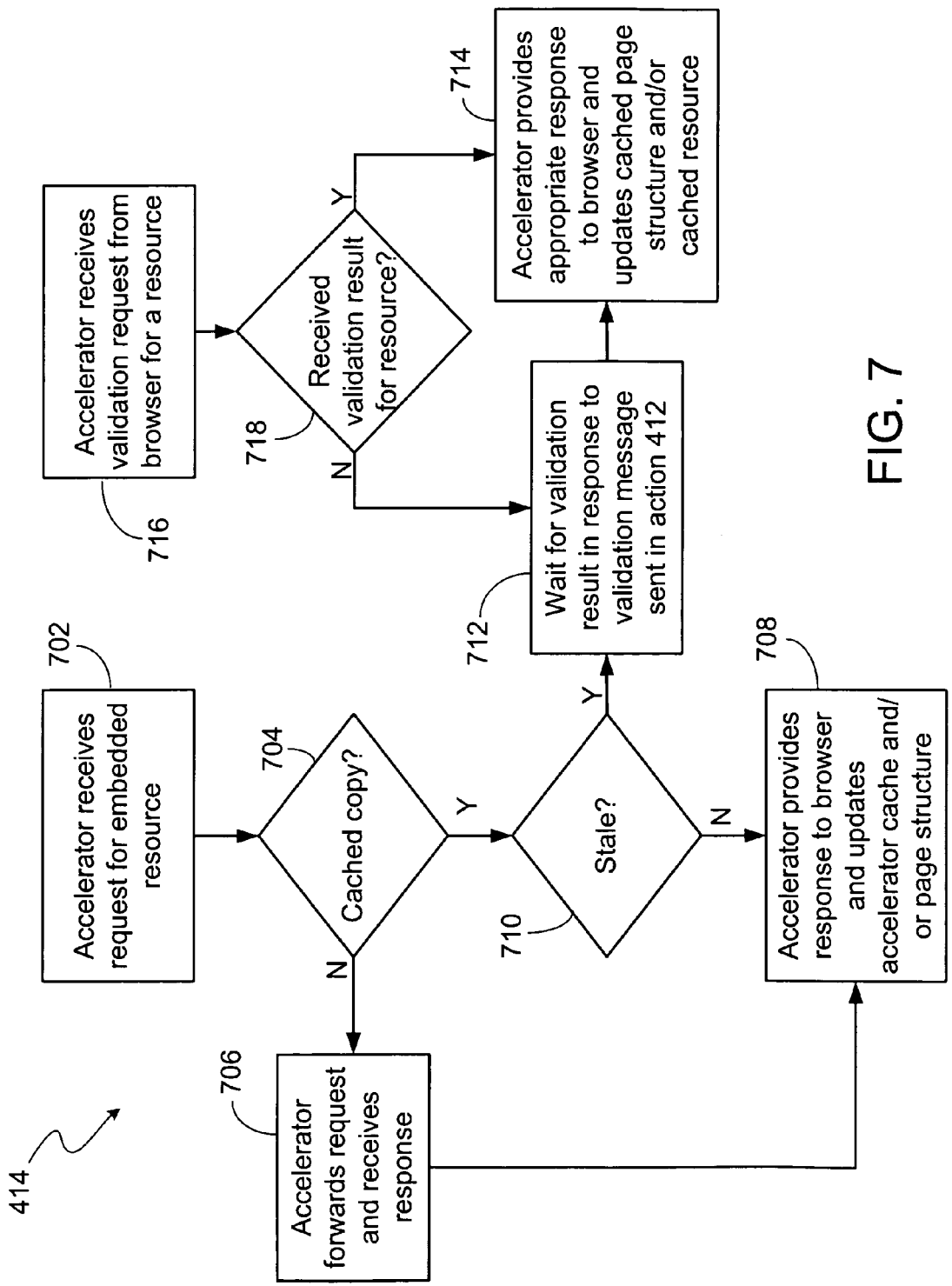

FIG. 7 illustrates one exemplary process that may be used to satisfy requests for embedded resources and validation requests received by accelerator 105 (414), which takes advantage of information obtained through the processes of actions 410 and 412 to decrease the latency in the rendering of the web page. The latency may be reduced in two situations. First, the latency may be reduced when accelerator processes requests for embedded resources received from browser 103 (714). Second, the latency may be reduced when accelerator 105 processes validation requests received from browser 103 (716).

With respect to requests for embedded resources, there are two scenarios in which the latency may be reduced. As described above, the validation message sent to ISP network 104 by accelerator 105 in action 412 may identify resources embedded in the web page that have not expired yet. As a result, these resources may still be stored in accelerator cache 105, even though they have expired and, possibly, been deleted from the browser cache. In fact, some of these resources may still be fresh in accelerator cache 105a. As such, the first scenario includes a resource that has been cleared from the browser cache, but is still stored in accelerator cache 105a and has not expired in accelerator cache. In this case, the latency may be reduced because accelerator 105 is able to immediately provide the resource to browser 103 in response to the browser's request for the resource. In the second scenario, the resource has been cleared from browser cache 103a, but is still stored in accelerator cache 105a and has expired in accelerator cache 105a. In this case, the resource may have been identified in the validation message sent by accelerator 105 in action 412. Consequently, a validation result may have been received by accelerator 105 before the request for the embedded resource is sent to accelerator 105 by browser 103. Accelerator 105, therefore, may be able to immediately provide the resource to browser 103 in response to the browser's request for the resource.

With respect to requests for validation, latencies may be reduced because the validation message sent by accelerator 105 in action 412 may have identified the resource for which validation is requested. As a result, accelerator 105 may have received the validation result for the resource before the browser issues the validation request or shortly thereafter. Consequently, a response to the validation request can be provided to browser 103 sooner than if the validation request sent by the browser 103 was forwarded to ISP network 104 to perform the validation of the resource.

More specifically, with respect to the actions performed for requests for embedded resources, accelerator 105 receives a request for an embedded resource from browser 103 when the embedded resource is not stored in browser cache 103a (702). When accelerator 105 receives the request for the embedded resource (702), accelerator 105 determines whether a cached copy of the resource is located in accelerator cache 105a (704).

If the resource is not stored in accelerator cache 105a, accelerator 105 forwards the request to ISP network 104 and receives a response to the request from origin server 112 or other server (706). The response may be, for example, an OK response that includes the resource or may be a File-Not-Found response. When accelerator 105 receives the response, accelerator 105 satisfies the browser's request by providing the response to browser 103 (708).

For example, if the web page includes an image, the browser 103 sends a request directed to, e.g., the origin server 112 or another server, to retrieve the image for display in the rendered web page. This request for the image is first routed to the accelerator 105, which, when accelerator cache 105a does not contain a copy of the image, forwards the request to a traffic server 108 through proxy server 106. If the image is cached at the traffic server 108, the traffic server 108 may respond to the request by sending the image. Otherwise, the traffic server 108 forwards the request to the origin server 112 or another server. The origin server 112 or other server then responds by sending the image. The response generated by origin server 112 or other server is sent back to accelerator 105 through ISP network 104. Accelerator 105 provides the response (which may include the requested resource) to browser 103 to satisfy the outstanding request generated by browser 103 for the resource. In addition, if a resource is returned and is cacheable, accelerator 105 may store it in accelerator cache 105a.

On the other hand, if a cached copy of the requested resource is located in accelerator cache 105a (704), accelerator 105 determines whether the cached copy is stale (710). If the cached copy is not stale, accelerator 105 provides a response to browser 103 that includes the cached copy of the resource. As described above, there may be resources that are stored in accelerator cache 105a that are not stale and not stored in browser cache 103 as a result of validation requests sent during previous renderings of the web page or the validation request sent during the current rendering of the web page. This may result in accelerator 105 being able to immediately respond to the browser's request for the embedded resource.

If, on the other hand, the cached copy of the resource is stale (710), then, as described above, an indication of the resource may have been included in the validation message. In this case, accelerator 105 may wait for the validation result corresponding to the requested resource (712) and, when accelerator 105 receives the validation result, accelerator 105 provides an appropriate response to browser 103 (714). For example, if the validation result includes a OK response with a modified resource, accelerator 105 provides a response to browser 103 that includes the modified resource. If the validation result includes a Not-Modified response, accelerator 105 provides browser 103 with a response that includes the cached copy of the resource. If the validation result includes a File-Not-Found response, this response is provided to browser 103. Also as described above, the validation result may be received before browser 103 sends the request for the resource or shortly thereafter, thereby decreasing the time until a response can be provided to browser 103.

With respect to the actions performed for validation requests, accelerator 105 receives a validation request for an embedded resource from browser 103 when the embedded resource is stored in browser cache 103a, but is stale or includes a must-revalidate directive, or otherwise requires validation (716). In this case, an indication of the resource may have been included in the validation message. Accordingly, when accelerator 105 receives the validation request for the embedded resource (716), accelerator 105 determines whether the corresponding validation result has been received from traffic servers (718). If so, accelerator 105 provides the appropriate response to browser 103 based on the validation result. If not, accelerator 105 may wait for the validation result corresponding to the requested resource (712) and, when accelerator 105 receives the validation result, accelerator 105 provides the appropriate response to browser 103 based on the validation result (714).

For example, if the validation result includes a OK response with a modified resource, accelerator 105 provides a response to browser 103 that includes the modified resource. If the validation result includes a Not-Modified response, accelerator 105 provides this response to browser 103, and browser 103 uses the copy of the resource located in browser cache 103a. If the validation result includes a File-Not-Found response, this response is provided to browser 103.

In some implementations, accelerator 105 may not wait for validation results (action 712) when a cached copy of the resource is in accelerator cache 105a and stale or when accelerator 105 receives a validation request, but the validation result has not yet been received. Rather, accelerator 105 instead may generate and send a (likely new and redundant) validation request when a cached copy of the resource is in accelerator cache 105a and stale (710) or may forward the validation request received from browser 103 when the validation result for the resource has not been received (718). In either case, the validation request is sent/forwarded to ISP network 104. Proxy server 106 and traffic servers 108 then process the request and perform the validation, sending the response (Not-Modified, OK with modified resource, or File-Not-Found) back to accelerator 105. Having the accelerator send or forward a validation request instead of waiting for validation results may help to insure that a response is received for a given request, for example, in the event a resource was not indicated in the validation message, a problem prevented traffic servers 108 from performing the validation based on the validation message, or a problem prevented the validation results from getting back to accelerator 105.

Referring again to FIG. 4A, accelerator 105 may generate or tune the page structure for the web page based on the requests for the embedded resources received from browser 103, validation requests received from browser 103, responses to requests sent by browser 103 or accelerator 105, and/or validation results.

When the request for the web page is the first request for that web page issued by browser 103 (or when the page structure has been cleared from accelerator cache 105a), accelerator 105 may use the requests issued and responses received while rendering the web page to generate the page structure. For instance, when the page structure includes only cacheable resources and their cache characteristics, accelerator 105 may receive the request for the web page from browser 103 and generate an unpopulated page structure that is stored in accelerator cache 105 and indexed according to the URL of the web page. As accelerator 105 receives requests for the embedded resources, accelerator 105 notes the URL of the embedded resources and then forwards the requests. Accelerator 105 also may note additional information, such as personalization information, that is added to the request from, for example, a cookie. When a response to a request is received and indicates the corresponding resource is cacheable, accelerator 105 enters the URL for the resource and cache characteristics for the resource into the page structure. Accelerator also may include the additional information in the entry for the resource.

Alternatively, or additionally, authoritative page structures may be used by accelerator 105 as the base page structure. An authoritative page structure corresponds to resources and information that the author of the web page guarantees will be included in the web page. Authoritative page structures may be provided by origin or other servers. Thus, for example, an authoritative page structure may correspond to web page 210 and be sent to accelerator 105 by origin server 112. The authoritative page structure includes resources that are guaranteed to be included in web page 210 and is stored by accelerator 105 as the base page structure for web page. This may provide a page structure for web page 210 even if web page 210 has not been previously requested, and also allows the accelerator to generate validation messages that include resources that are guaranteed to be in web page 210.

When a page structure is stored in accelerator cache 105a, accelerator 105 may use the requests and responses issued and received, and the validation results, to tune the page structure to include the current embedded resources and their cache characteristics. For example, if a File-Not-Found response is returned in response to a request for a resource or in response to validation of the resource, the entry in the page structure corresponding to the resource may be removed. Similarly, while rendering the web page, if browser 103 issues requests for resources that were not included in the page structure and an OK response is returned including the resource, then an entry for the resource may be added in the page structure. Furthermore, for instance, if new cache characteristics for a resource are returned as part of the validation results or as part of a response to a request for the resource, the entry for the resource may be updated to reflect the new cache characteristics.

An alternative or additional manner of updating the page structure involves the examination of sibling pages to determine updates to the resources in the page structure and/or their cache characteristics.

A sibling page is a related web page that shares some of the same resources as the original web page for which the page structure was constructed. Some web sites use similar content across their web pages, for example, to create the same look and feel across the web pages. As a result, many of the web pages for the web site use the same embedded resources (for example, style sheets, java script, images for logos, etc.). For example, a web site (such as www.cnn.com) may use the same banner image across the top of its web pages to indicate the name of the web site. To discover sibling pages, the URLs of the web pages requested by client computer 102 can be canonicalized to determine similar URLs, and a differential mapping can be performed on the page structures for the similar URLs to determine similarities between the web pages. If the similarities exceed a particular threshold (which may be empirically determined), then the pages are considered to be sibling pages. When the page structures of a sibling page is changed, then entries for the common resources in the other sibling pages are changed as well. For instance, the cache characteristics of URLs common to a set of sibling pages may be updated with new characteristics when the URL in one of the sibling page's page structure is changed (e.g., as a result of requesting the web page associated with the URL). As another example, if a common URL is deleted in the page structure of one sibling web page, it may be deleted in the other sibling pages.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. For example, while proxy server 106 and traffic servers 108 have been illustrated, other architectures may be used. For instance, a single traffic server 108 may be used and/or proxy server 106 may be eliminated (i.e., a proxy server to balance the loads may not be used or may be replaced with other load balancing technologies). Further, the functionality of traffic servers 108 may be incorporated into accelerator 105 such that accelerator 105 sends the requests for validation. Also, while a separate accelerator component 105 has been described, the functionality of accelerator 105 may be incorporated directly into browser 103.

In addition, while the foregoing has described the various components of network 100 as using the HTTP protocol, other standard or proprietary communication protocols may alternatively be used. In another implementation, for example, proprietary browsing software may execute on client computer 102 and may communicate with other computers on ISP network 104 using proprietary protocols, or a mix of standard and proprietary protocols. Proxy server 106 or traffic servers 108 may interface service provider network with Internet 110 by translating requests and responses from the proprietary protocol into the standard protocols. Additionally, if the browser executing on client computer 102 only renders web pages written in a proprietary language and a web page written in a standard language is retrieved from origin server 112, proxy server 106 or traffic servers 108 may convert the standard language web page into a proprietary language web page.

In other implementations, Internet 110 may use other standard or proprietary communication protocols and web pages may be written in other standard or proprietary languages. In general, the standard or proprietary protocol or language used on Internet 110 may be the same or different than the standard or proprietary protocol or language used on ISP network 104.

Furthermore, techniques other than a conditional GET may be used to validate resources in an HTTP or other implementation.

Accordingly, other implementations are within the scope of the following claims.

What is claimed is:

1. A method for validating cached embedded resources in a web page, the method comprising:
   receiving a validation message from a client system executing a web browser, the validation message identifying at least one resource embedded in a web page and stored in a cache of the web browser, wherein the validation message is sent by the client system prior to the web browser issuing an HTTP validation request for the embedded resource;
   generating a request to validate the embedded resource to determine whether the embedded resource has been modified since the embedded resource was stored in the cache of the browser, the embedded resource being identified in the validation message sent by the client system;
   sending the request to validate the embedded resource to a server;
   receiving, from the server and in response to the request sent to the server, a validation response;
   sending the validation response to the client system to provide the validation response to the web browser rendering the web page to satisfy the HTTP validation request issued by the browser to validate the embedded resource;
   determining whether a URL for the web page is similar to a URL for a second web page based on canonicalizing the URL for the web page and the URL for the second web page;
   when the URL for the web page is determined to be similar to the URL for the second web page, performing a differential mapping between the page structure corresponding to the web page and a page structure corresponding to the second web page to determine if similarities between the page structures exceed a threshold; and
   when the similarities between the page structure corresponding to the web page and the page structure corresponding to the second web page exceed the threshold, determining the second web page to be a sibling web page and updating the page structure corresponding to the web page based on changes to the sibling web page.

2. The method of claim 1 wherein receiving the validation message comprises receiving the validation message at a traffic server on a network of an Internet service provider and receiving the validation response comprises receiving the validation response at the traffic server.

3. The method of claim 1 wherein sending the request to validate the embedded resource to a server comprises sending a conditional-GET for the embedded resource to the server.

4. The method of claim 1 further comprising:
   receiving multiple validation messages from one or more client systems, the multiple validation messages identifying embedded resources in the web page;
   generating an aggregate page structure by determining common embedded resources among the multiple validation messages; and
   prioritizing the request to validate the embedded resource based on the validation message sent by the client system and the aggregate page structure.

5. The method of claim 1 further comprising:
   receiving multiple validation messages from one or more client systems, the multiple validation messages identifying embedded resources in the web page;

generating an aggregate page structure by determining which one of the multiple validation messages was most recently received; and determining to send the request to validate the embedded resource based on a union of the aggregate page structure and the validation message sent by the client system.

6. The method of claim 1 further comprising receiving the validation message in a single message.

7. A non-transitory computer-readable storage medium storing a computer program for validating cached embedded resources in a web page, the computer program comprising instructions for causing a computer to perform the following operations:

generate a page structure that corresponds to a web page and indicates at least one resource embedded in the web page;

generate a validation message based on the page structure, the validation message identifying the embedded resource stored in a cache of a web browser;

send the validation message to a first server prior to the web browser issuing an HTTP validation request for the embedded resource;

receive, from the first server, a validation response for the embedded resource;

and provide the validation response to a web browser rendering the web page to satisfy an HTTP validation request to validate the embedded resource issued by the web browser, wherein the computer program further comprises instruction for causing the computer to:

determine whether a URL for the web page is similar to a URL for a second web page based on canonicalizing the URL for the web page and the URL for the second web page;

when the URL for the web page is determined to be similar to the URL for the second web page, perform a differential mapping between the page structure corresponding to the web page and a page structure corresponding to the second web page to determine if similarities between the page structures exceed a threshold; and when the similarities between the page structure corresponding to the web page and the page structure corresponding to the second web page exceed the threshold, determine the second web page to be a sibling web page and update the page structure corresponding to the web page based on changes to the sibling web page.

8. The non-transitory medium of claim 7 wherein the computer program further comprises instructions for causing a computer to:

send requests for embedded resources in the web page during an initial rendering of the web page; and wherein, to generate the page structure, the computer program comprises instructions for causing a computer to generate the page structure based on responses received in response to the requests for embedded resources sent during the initial rendering of the web page.

9. The non-transitory medium of claim 8 wherein the computer program further comprises instructions for causing a computer to:

send requests for embedded resources in the web page during a subsequent rendering of the web page; and update the page structure based on responses received in response to the requests for embedded resources sent during the subsequent rendering of the web page.

10. The non-transitory medium of claim 7 wherein, to update the page structure based on changes to the sibling web page, the computer program further comprises instructions for causing a computer to:

send requests for embedded resources in the sibling web page during a rendering of the sibling web page; and update the page structure corresponding to the web page based on responses received in response to the requests for embedded resources sent during the rendering of the sibling web page.

11. The non-transitory medium of claim 7 wherein the first server comprises a traffic server on a ISP network such that the instructions for causing a computer to send the validation message to the first server comprise instructions for causing a computer to send the validation message to a traffic server on a ISP network.

12. The non-transitory medium of claim 7 wherein the computer program further comprises instructions for causing a computer to:

receive a request for the web page from a web browser; and wherein, to send the validation message to the first server prior to the web browser issuing the request to validate the embedded resource, the computer program further comprises instructions for causing a computer to send the validation message to the first server substantially simultaneous to receiving the request for the web page from the web browser.

13. The non-transitory medium of claim 7 wherein the computer program further comprises instructions for causing a computer to generate a single validation message.

14. The non-transitory medium of claim 7 wherein the validation message identifies the embedded resource by indicating a URL for the embedded resource.

15. The non-transitory medium of claim 7 wherein the page structure only indicates cacheable embedded resources of the web page.

16. The non-transitory medium of claim 7 wherein a cached copy of the embedded resource is stale when the validation message is generated.

17. The non-transitory medium of claim 16 wherein:

a cached copy of a second embedded resource of the web page will become stale at a set time in the future when the validation message is generated, and the generated validation message additionally indicates the second embedded resource.

18. The non-transitory medium of claim 7 wherein, to send the validation message and receive the validation response, the computer program comprises instructions for causing a computer to:

send the validation message to a first server prior to a web browser issuing a request to validate the embedded resource such that the first server sends a request to validate the embedded resource to a second server; and receive, from the first server, a validation response for the embedded resource received by the first server in response to the request sent to the second server.

19. A method for validating cached embedded resources in a web page, the method comprising:

receiving a validation message from a client system executing a web browser, the validation message identifying multiple resources embedded in a web page and stored in a cache of the web browser, wherein the validation message is sent by the client system prior to the web browser issuing an HTTP validation request for the embedded resource;

generating requests to validate the embedded resources to determine whether the embedded resource has been modified since the embedded resource was stored in the cache of the browser, the embedded resource being identified in the validation message sent by the client system;

sending the requests to validate the embedded resources to one or more servers;

receiving, from the servers and in response to the requests sent to the server, validation responses;

sending the validation responses to the client system to provide the validation responses to the web browser rendering the web page to satisfy the HTTP validation requests issued by the browser to validate the embedded resources;

determining whether a URL for the web page is similar to a URL for a second web page based on canonicalizing the URL for the web page and the URL for the second web page;

when the URL for the web page is determined to be similar to the URL for the second web page, performing a differential mapping between the page structure corresponding to the web page and a page structure corresponding to the second web page to determine if similarities between the page structures exceed a threshold; and when the similarities between the page structure corresponding to the web page and the page structure corresponding to the second web page exceed the threshold, determining the second web page to be a sibling web page and updating the page structure corresponding to the web page based on changes to the sibling web page.

20. The method of claim 1, wherein receiving the validation message from the client system executing the web browser includes receiving the validation message at a proxy server, the validation message being sent from the client system executing the web browser.

21. The method of claim 1, wherein generating the request to validate the embedded resource includes generating the request at a proxy server.

22. The method of claim 19, wherein receiving the validation message from the client system executing the web browser includes receiving the validation message at a proxy server, the validation message being sent from the client system executing the web browser.

23. The method of claim 19, wherein generating requests to validate the embedded resource includes generating requests at a proxy server.

24. The medium of claim 7, wherein sending the validation message to the first server prior to the web browser issuing an HTTP validation request for the embedded resource includes sending the validation message from a proxy server to the first server.

\* \* \* \* \*